United States Patent
Tran

[11] Patent Number: 5,974,084
[45] Date of Patent: Oct. 26, 1999

[54] METHOD OF OPERATING A MODEM IN THE PRESENCE OF INTERRUPTED DIAL TONE

[75] Inventor: To Van Tran, Kanata, Canada

[73] Assignee: Mitel Corporation, Ontario, Canada

[21] Appl. No.: 08/970,152

[22] Filed: Nov. 13, 1997

[51] Int. Cl.$^6$ .................... H04B 1/38; H04L 5/16
[52] U.S. Cl. ........................... 375/222; 379/67
[58] Field of Search .............. 375/222; 379/67, 379/69, 133

[56] References Cited

U.S. PATENT DOCUMENTS 5,448,624  9/1995  Hardy et al. ................. 379/67

*Primary Examiner*—Stephen Chin
*Assistant Examiner*—Phuong Phu
*Attorney, Agent, or Firm*—Staas & Halsey, LLP

[57] ABSTRACT

According to the present invention, a method is provided enabling an analog modem to dial out while a dial tone is interrupted or stuttered due to at least one unheard message at a Central Office for a subscriber to Call Answer is provided. Call Answer is an automated voice messaging system which causes the dial tone of a phone line connected to the modem, to be either interrupted or stuttered when a message is waiting for the subscriber. Users of the present invention are able to receive on-line access faster than users of the prior art. The method of the present invention implements a software program within the modem. By comparing the elapsed length of the dial tone with two predetermined time values (a maximum and a minimum), the method detects the presence and status of the dial tone and informs the modem of the status of the dial tone. Provided that a dial tone is present, whether uninterrupted, interrupted or stuttered, the modem proceeds to dial out.

4 Claims, 2 Drawing Sheets

METHOD OF OPERATING A MODEM IN THE PRESENCE OF INTERRUPTED DIAL TONE

FIELD OF THE INVENTION

This invention relates in general to analog modems and more specifically to an analog modem which is capable of dialing out when a dial tone is interrupted, stuttered or uninterrupted.

BACKGROUND OF THE INVENTION

Prior art modems suffer from the disadvantage of requiring steady uninterrupted dial tone in order to dial out. The presence of at least one unheard message in a voice mailbox for a subscriber's line, in connection with which a central office Call Answer feature has been activated, causes an interrupted or stuttered dial tone on the line. In order for the modem to dial out, the interrupted or stuttered dial tone must be returned to its regular uninterrupted state, which requires the subscriber of the phone line to retrieve unheard messages from the voice mailbox. The inability of prior art modems to dial out in the presence of interrupted dial tone imposes delays in modem activation and frustration for the modem user who wishes to have quick access to on-line features via the modem.

SUMMARY OF THE INVENTION

The present invention is directed at a solution to the problem of allowing modems to dial out when the dial tone is interrupted or stuttered.

According to the present invention, a method is provided which allows a modem to dial out provided that a dial tone is present on the phone line connected to the modem. Users of the present invention are able to receive on-line access faster than users of the prior art. The method implements a software program within the modem. By comparing the elapsed length of the dial tone with two predetermined time values (a maximum and a minimum), the method detects the presence and status of the dial tone and informs the modem of the status of the dial tone. Provided that a dial tone is present, whether uninterrupted, interrupted or stuttered, the modem proceeds to dial out.

According to one aspect of the present invention, there is provided a method for operating a modem, connected to a phone line, in the presence of interrupted dial tone on the phone line comprising the steps of:

a) requesting and receiving elapsed time since the dial tone was on;

b) comparing the elapsed time to a first predetermined time value and ceasing use of the modem if the elapsed time is greater than the first predetermined time value;

c) if the elapsed time is less than the first predetermined time value, then comparing the elapsed time to a second predetermined time value which is less than the first predetermined time value and ceasing use of the modem if the elapsed time is less than the second predetermined time value; and d) if the elapsed time is greater than the second predetermined time value, causing the modem to dial out on the phone line.

BRIEF DESCRIPTION OF THE DRAWINGS

An embodiment of the invention is described herein below with reference to the accompanying drawings, in which.

DETAILED DESCRIPTION OF THE PREFERRED EMBODIMENT

Figure 1:
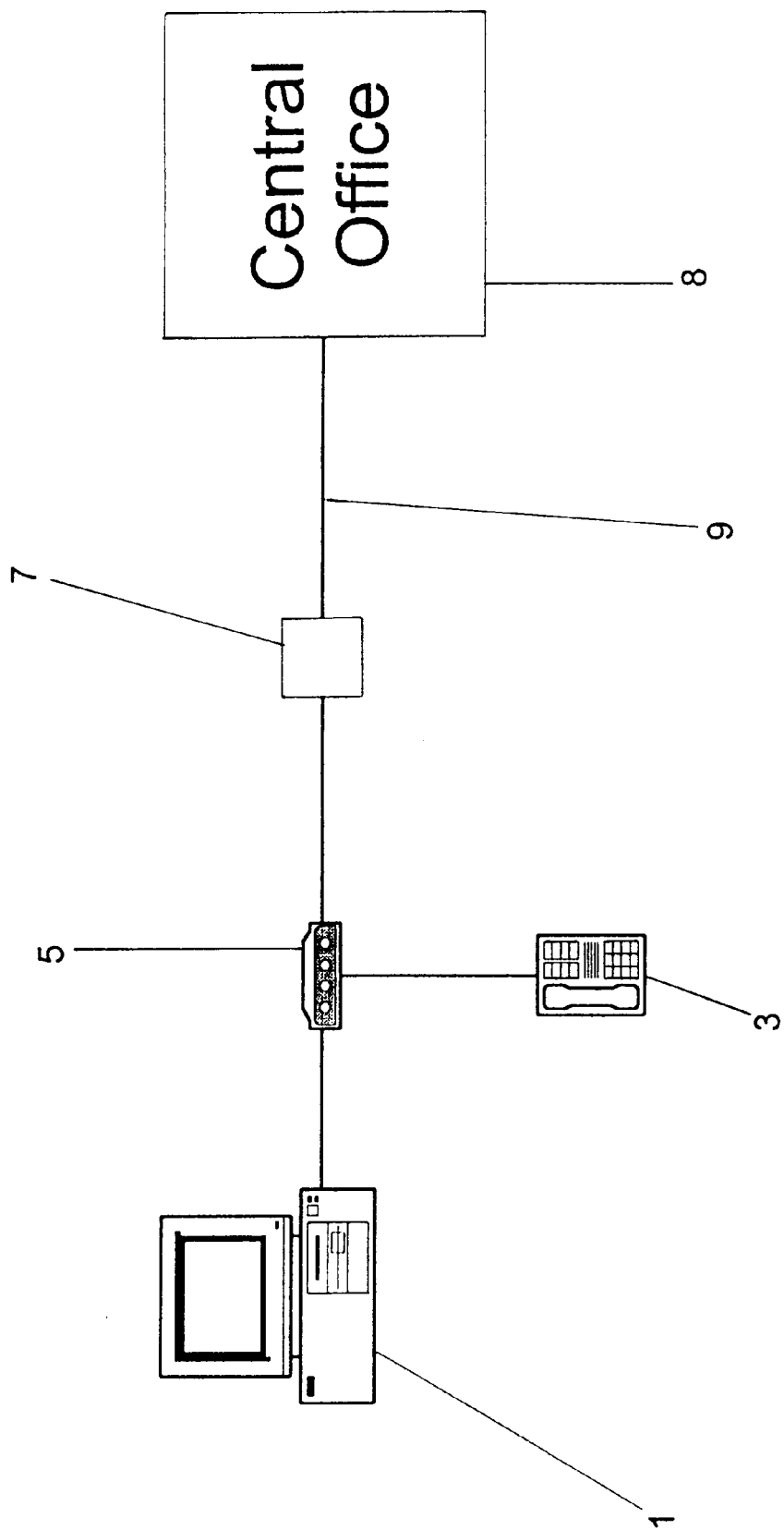
FIG. 1 is a block diagram of a well-known modem setup.

Turning to FIG. 1, a computer 1 and a telephone 3 are shown connected to an external modem 5. Although an external modem is shown, the modem may alternatively be an internal modem within the computer 1. The modem 5 is further connected to a phone jack 7. The phone jack 7 is connected to a phone line 9 which maintains a connection with a central office 8 where all telephone features are originated.

To initiate a connection with the telephone central office 8 via phone line 9, TELIN and TELOUT terminals of the modem 5 are connected to the telephone Tip and Ring terminals (normally located at Pin 3 and Pin 4 of the telephone jack 7). When the modem 5 goes off hook, the modem detects if the dial tone is ON by executing the program CHK_TONE which simply reads the Input/Output address $0B on the modem chip. If bit 7 of this address is high, the tone is acknowledged to be On, otherwise, the tone is acknowledged to be Off. Upon receiving the dial tone, the modem 5 goes off hook and the modem 5 passes through a series of call progress states beginning with Wait_Dial() and proceeding to Parse_Digits() and then finally to Connect(). When in the connected state, Dual Tone Multi Frequency (DTMF) signals are sent to the central office 8 in the usual manner. All these programs will be well known to those skilled in the art.

However, in accordance with the principles of the present invention, a method is provided for enabling the modem 5 to dial out while a dial tone is interrupted or stuttered.

The status of the dial tone is determined by a computer program located within the modem whose syntax is shown herein below:

```
?DIALSTABLE:    DB 08           ; Mitel changed April 15, 1997
    for US
                                 to work
                                ; 80 ms
CHK_DIALTONE:                   ; Examine ON duration
    LDRP        R4, MS10CLOCK
                                ; Get time elapsed since tone
                                  was on
    CMRPIM      R4, DEBOUNCE_TIME
                                ; More than the debounce time?
    BCC         ?DIALT_CHK
    SETFLD      DEBOUNCE_DONE
                                ; Indicate there is no dialtone
    SETFLD      VALID_CADENCE
    RTS
?DIAL_CHK:
    CMR         R4, DIALSTABLE
                                ; For primary dial tone
    BCC         ByeCHK_RESULTS
    SETFLD      FOUND_DIALONE
                                ; Indicate dial tone detected
    RTS
ByeCHK_RESULTS:
    RTS
```

Figure 2:
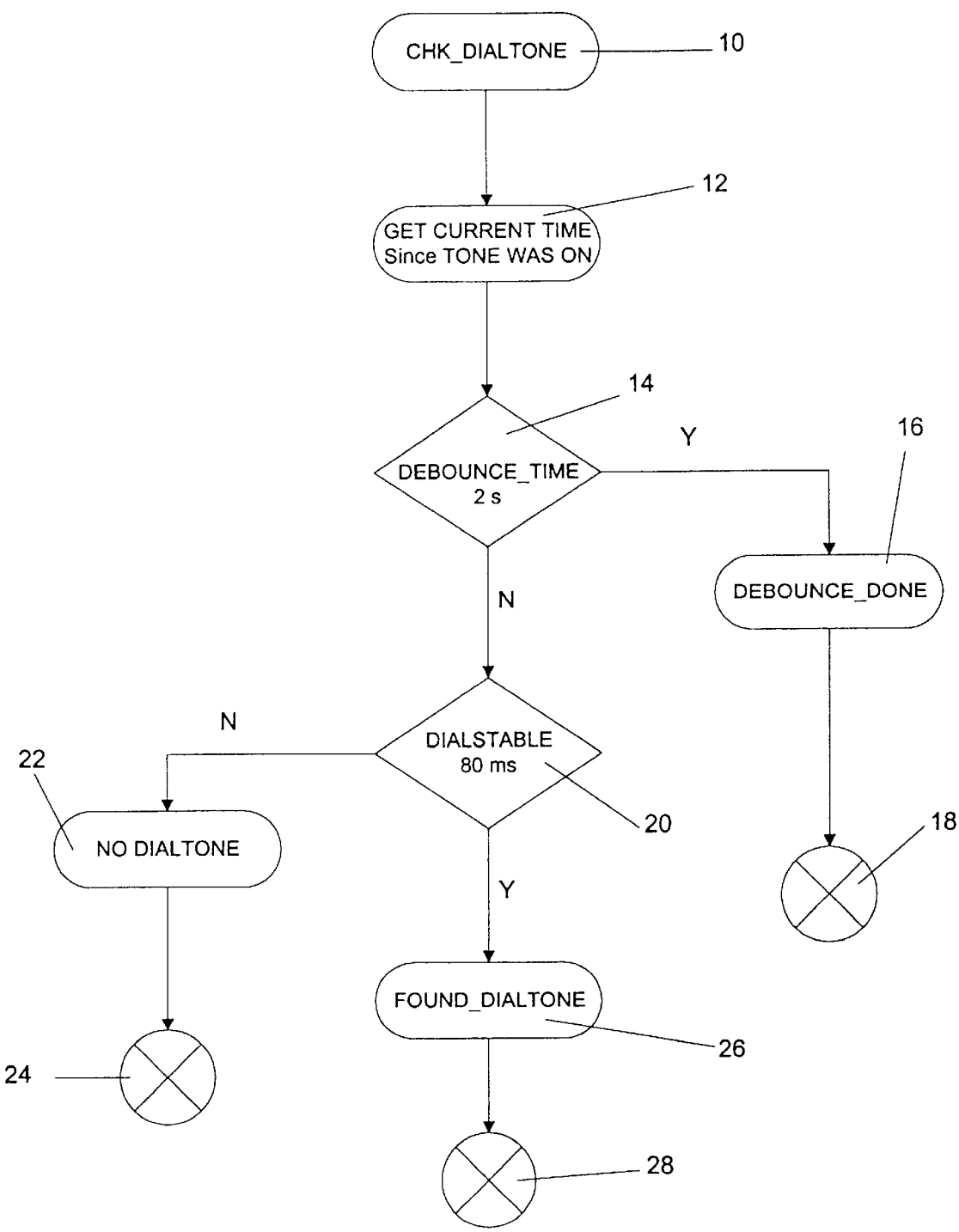
FIG. 2 is a flowchart showing the process by which a modem deduces the presence and status of a dial tone in accordance with the preferred embodiment.

The computer program listed herein above, may be represented by the algorithm shown in the flowchart of FIG. 2. After the constant ?DIALSTABLE has been set, at step 10 the CHK_DIALTONE program is called for examining the ON duration of the dial tone previously detected using CHK_TONE discussed above. The modem 5 then requests the elapsed time since the dial tone has been on, shown in step 12.

The elapsed time is stored in the MS10CLOCK variable and loaded into a register, R4, using the command line LDRP R4, MS10CLOCK. MS10CLOCK is a software timer which is simply a byte in memory working like a counter. The value of MS10CLOCK increases every 10 ms in an interrupt service routine of the above program. The following section of code shows how the MS10CLOCK program runs:

```
INC    MS10CLOCK      ; Increment 10 ms clock low byte
BNE    ?Exit_IRQ      ; break if not wrap time
INC    MS10CLOCK+1    ; Increment 10 ms clock mid byte
BNE    ?Exit_IRQ      ; break if not wrap time
INC    MS10CLOCK+2    ; Increment 10 ms clock high byte
```

From this program, it is clear that MSCLOCK+2=$FF (256) MS10CLOCK+1 and MS10CLOCK+1=$FF(256) MS10CLOCK where the value $FF is a decimal value of 256.

To initialize these variables, the following section of code is used:

```
LDA    #00H
STA    MS10CLOCK
STA    MS10CLOCK+1
STA    MS10CLOCK+2
```

After loading the elapsed time into register R4, the modem compares this value to a predetermined value (step 14). The command CMRPIM R4, DEBOUNCE_TIME compares the value in register R4 with the predetermined constant DEBOUNCE_TIME.

If the elapsed time (retrieved in step 12 as MS10CLOCK) is greater than the predetermined constant (in the preferred embodiment chosen to be 2 s), the DEBOUNCE_DONE flag (step 16) sets and modem use ceases at step 18. The instruction SETFLD DEBOUNCE_DONE informs the modem that dialing out is not possible. The instruction RTS returns the computer program back to the main body of the computer code, which does not form part of the present invention but would be well known by persons skilled in the art. Otherwise, if the elapsed time is less than the predetermined constant, the modem 5 checks with the constant DIALSTABLE discussed below (step 20). This branch operation is achieved through the instruction BCC ?DIALT_CHK which causes the program to jump to the ?DIALT_CHK procedure if the value in R4 is less than the value in DEBOUNCE_TIME (step 14).

In step 20, the R4 value is compared to a second predetermined time value to ensure that the dial tone is stable. This second compare produces a range for which the dial tone must fall within before the modem may dial out. The instruction CMR R4, DIALSTABLE compares the elapsed time found in step 12 with the predetermined constant DIALSTABLE. If the value in register R4 is found to be less than the value of 80 ms (the value chosen in the preferred embodiment), the program jumps to the ByeCHK_ RESULTS procedure (step 22) and modem use ceases at step 24. This is achieved by the commands BCC ByeCHK_ RESULTS and RTS respectively. Otherwise, if the value in R4 is greater than DIALSTABLE, then dial tone is deemed to have been found (step 26) and the modem 5 dials out (step 28). This is achieved through the instruction SETFLD FOUND_DIALTONE which informs the modem that dialing out is possible.

In summary, the method of the present invention, allows a modem to properly detect dial tone, whether the tone is uninterrupted, stuttered or interrupted. According to the preferred embodiment, the modem is able to detect interrupted or stuttered dial tones from 80 to 160 ms+/−5 ms (i.e. silent intervals up to 160 ms+/−5 ms are recognized as interrupted or stuttered dial tone). Although Call Answer is listed as reason for causing the interrupted or stuttered dial tone, it should be noted that this modem is able to detect the presence of the dial tone of the connected phone line and is not used solely to detect interrupted or stuttered dial tones caused by the Call Answer feature.

It will be appreciated that, although a particular embodiment has been described and illustrated in detail, various changes and modifications may be made. One such change is in the name of the variables within the computer program. Provided that all name changes are made globally (i.e. throughout the program), the program will function in the same manner. Also, in the preferred embodiment, Call Answer is listed as the source of the interrupted or stuttered dial tone. It should be noted that there may be other reasons as to why a dial tone might become interrupted or stuttered yet remain stable. Another contemplated modification is in the choice of the predetermined time values. Although the values of 2 s and 80 ms have been chosen for DEBOUNCE_TIME and DIALSTABLE, respectively in the preferred embodiment of the present invention, they may be changed to accommodate various other features telephone companies may offer. All such changes and modifications may be made without departing from the sphere and scope of the invention as defined by the claims appended hereto.

I claim:

1. A method for operating a modem, connected to a phone line, in the presence of interrupted dial tone on said phone line comprising the steps of:
   a) requesting and receiving elapsed time since said dial tone was on;
   b) comparing said elapsed time to a first predetermined time value and ceasing use of said modem if said elapsed time is greater than said first predetermined time value;
   c) if said elapsed time is less than said first predetermined time value, then comparing said elapsed time to a second predetermined time value which is less than said first predetermined time value and ceasing use of said modem if said elapsed time is less than said second predetermined time value; and
   d) if said elapsed time is greater than said second predetermined time value, causing said modem to dial out on said phone line.

2. The method of claim 1 wherein said first predetermined value is 2 seconds.

3. The method of claim 1 wherein said second predetermined value is between 80 and 160 ms.

4. The method of claim 1 wherein said modem is an analog modem.

* * * * *